United States Patent [19]

Steinberg et al.

[11] 4,054,822
[45] Oct. 18, 1977

[54] CONTOURING CONTROL SYSTEM EMPLOYING RAMP STAIRCASING OF POSITION POINTS

[75] Inventors: Walter A. Steinberg, Huntington Station; Howard E. Parker, Plainview, both of N.Y.

[73] Assignee: Autonumerics, Inc., Hauppauge, N.Y.

[21] Appl. No.: 642,067

[22] Filed: Dec. 18, 1975

Related U.S. Application Data

[63] Continuation of Ser. No. 259,407, June 5, 1972, abandoned.

[51] Int. Cl.² .......................................... G05B 19/24
[52] U.S. Cl. ................................. 318/573; 318/574
[58] Field of Search .............. 318/570, 571, 573, 574, 318/696; 235/152, 151.11

[56] References Cited

U.S. PATENT DOCUMENTS

| | | | |
|---|---|---|---|
| 3,372,268 | 3/1908 | Hoernes | 235/152 IE |
| 3,461,365 | 8/1969 | Newland et al. | 318/573 |
| 3,619,582 | 11/1971 | Iwamoto et al | 235/152 |
| 3,652,839 | 3/1972 | Maekawa et al. | 235/152 IE |

*Primary Examiner*—Robert K. Schaefer
*Assistant Examiner*—John J. Feldhaus
*Attorney, Agent, or Firm*—Edward H. Loveman

[57] ABSTRACT

A control system for positioning a machine member in accordance with a set of predetermined instructions corresponding to a prescribed path of movement of the machine member includes first and second motor driving means operative in two mutually perpendicular directions to drive the machine member, pulse generating means to actuate the motor driving means, and a contour logic circuit to enable operation of the motor driving means in such a way that the machine member follows a staircase path closely conforming to the prescribed path. Drive of the first motor driving means is continuously maintained and drive of the second motor driving means is permitted only when required, then drive of the second motor driving means is continuously maintained and drive of the first motor driving means is permitted only when required.

7 Claims, 12 Drawing Figures

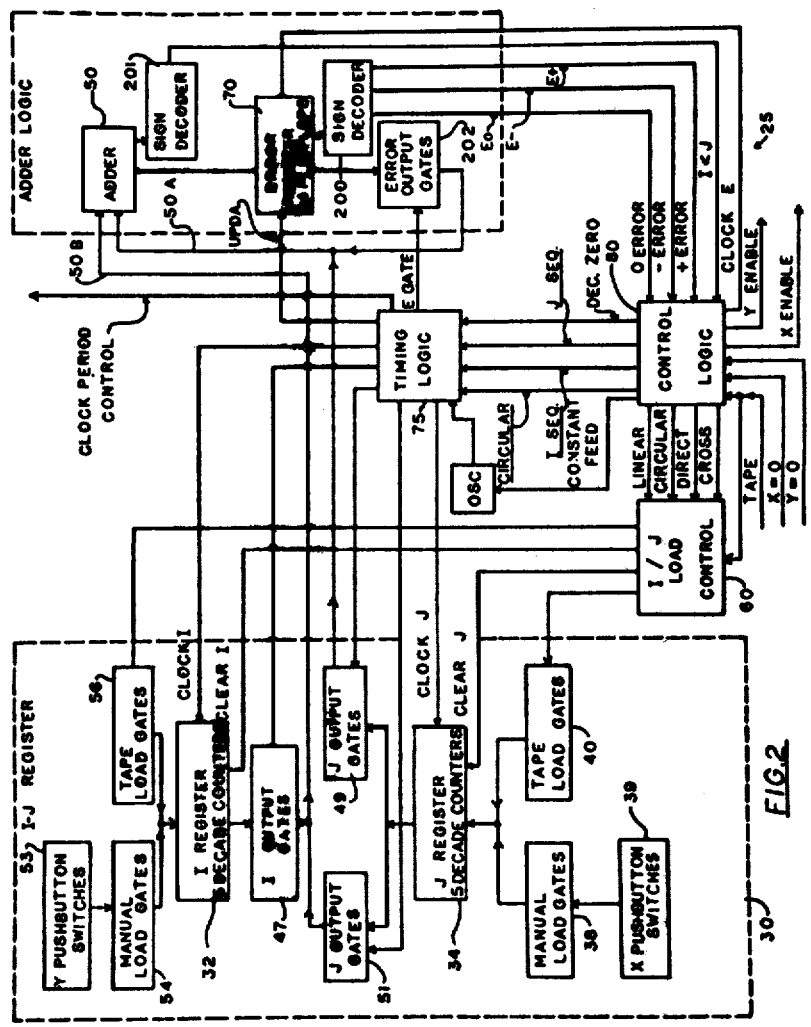

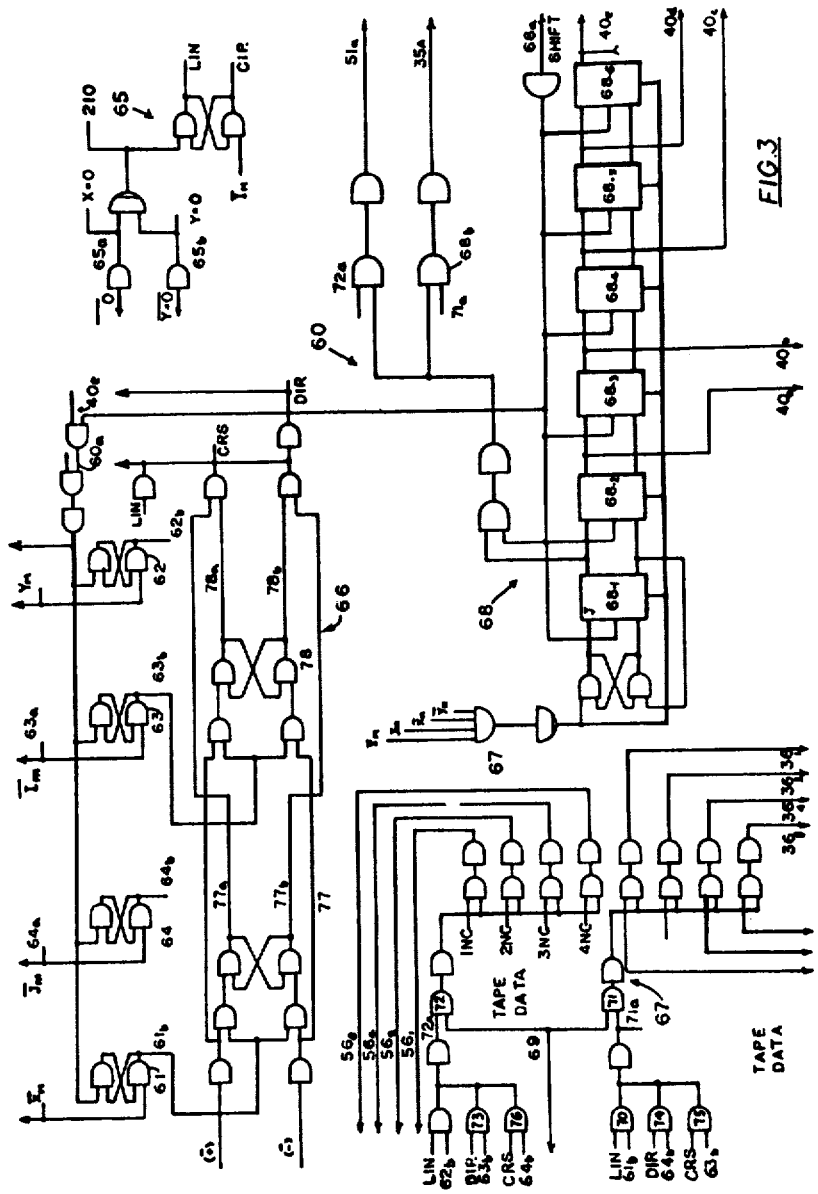

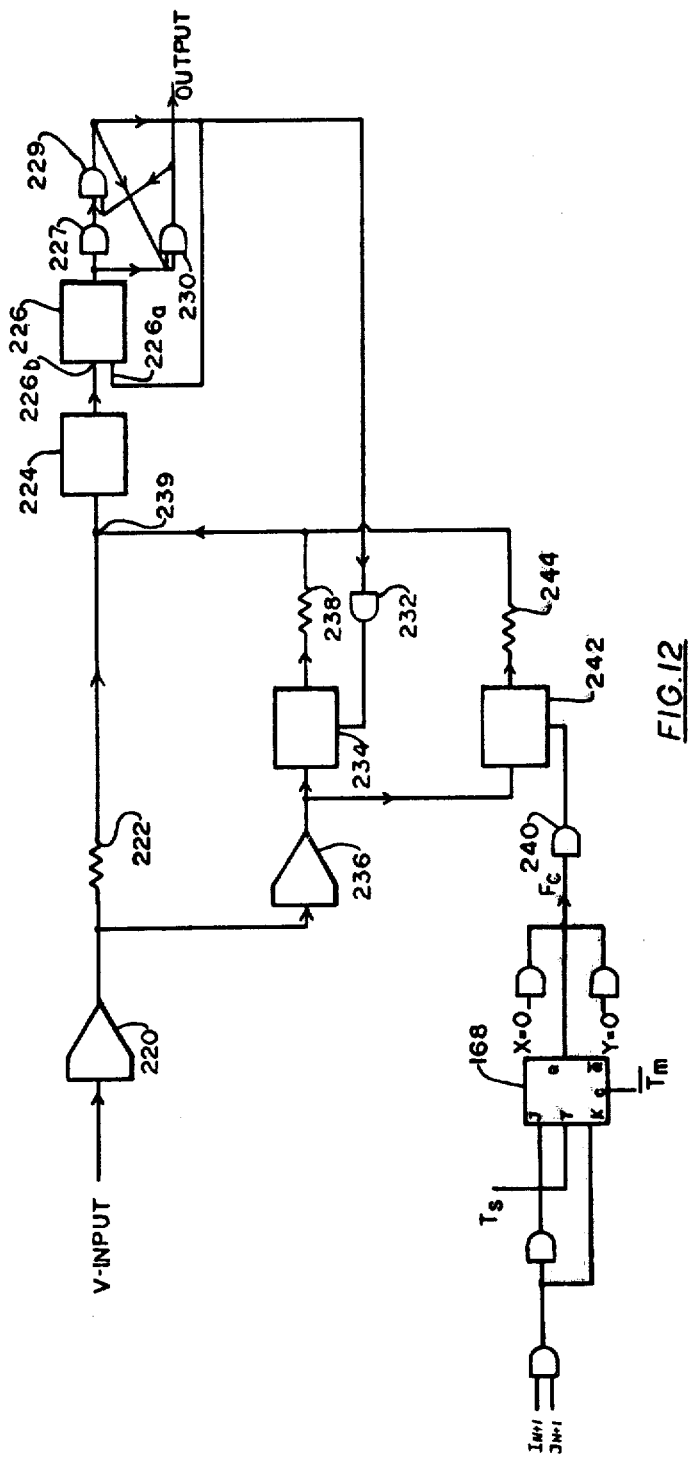

CONTOURING CONTROL SYSTEM EMPLOYING RAMP STAIRCASING OF POSITION POINTS

This is a continuation of application Ser. No. 259,407 filed June 5, 1972, now abandoned.

This invention relates to the art of contour control systems of the type in which a machine member is moved along a path determined by data representing coordinates of points along the path.

The invention involves improvements over the positional control system described in my patent application Ser. No. 808,526 filed Mar. 19, 1969 which issued on Feb. 2, 1971 as U.S. Pat. No. 3,560,830.

The purpose of the present invention is to effect movements of the driven machine member along a path which more closely conforms to the path prescribed by contour data fed into the system. This data may be read in from a prepunched tape or may be inserted manually or by magnetic tape, etc.

Many of the attendant advantages of this invention will be readily appreciated at the same becomes better understood by reference to the following detailed description when considered in connection with the accompanying drawings in which:

FIG. 2 is a diagram of a contour logic circuit according to the invention;

FIG. 3 is a diagram of a load control circuit;

FIG. 12 is a diagram of the variable clock circuit.

Figure 6:
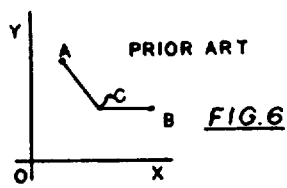
FIGS. 6 through 11 are graphs used in explaining the theory underlying the operation of the invention.

Referring now to the drawings wherein like reference characters designate like or corresponding parts throughout, the theory of operation will first be explained with particular reference to FIGS. 6 through 11. In a conventional point-to-point control system for positioning a machine member in a path determined by Cartesian coordinates such as that described in my hereinabove mentioned patent, motions in an X-Y plane are performed by inserting pulses representing magnitude and direction along the X and Y axes. The logic circuit of the system then issues simultaneous pulses to motors driving in the X and Y directions while the logic counts inserted values of X and Y to zero. When either value count reaches zero, pulses to the motor driving the machine member along that particular axis are cut off. This motion is illustrated in FIG. 6 where the graph shows motion from point A to point B in the X-Y plane. The motion is initially oblique with respect to both X and Y axes until point C is reached. Then drive in the Y direction ceases while it continues in the X direction along to Point B.

Figure 7:
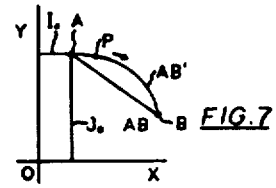
Figure 8:
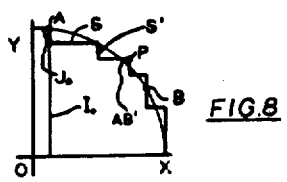

When the point-to-point control system is modified by a circuit embodying the present invention, pulses are fed to the motors driving the machine member in the X and Y directions respectively, so that motion proceeds directly from point A to point B along the straight line AB as shown in FIG. 7. The motion may also be programmed to follow a circular arc AB' from point A to point B. This mode of operation is based on the following considerations.

When moving a point P along the circular arc AB' from A to B about a point "O" the coordinates of the start point A are $I_o J_o$. As P moves along with AB', the I coordinate in the X direction increases and the J coordinate in the Y direction decreases. Initially the square of radium vector has a value of $I_o^2 + J_o^2$. If point P is displaced one step to the right of the arc AB' an error E in the square of the radius vector will result as follows:

$$E = (I_o + 1)^2 + J_o^2 - (I_o^2 + J_o^2) = I_o + (I_o + 1)$$

If instead, point P was displaced one unit below the arc, an error E' in the square of the radius vector will result as follows:

$$E' = I_o^2 + (J_o - 1)^2 - (I_o^2 + J_o^2) = -J_o - (J_o - 1)$$

In general if point P is not on the arc, there is an error, and a step in the +X direction will cause this error to go positive by $I + (I + 1)$, whereas a step in the -Y direction will cause the error to go negative by $J + (J - 1)$ where I and J are the coordinates of point P Prior to the move as indicated in FIG. 7.

The above relationships suggest a way of determining how to move point P in the X-Y plane so that its path most closely follows the arc AB'. The initial values $I_o$ and $J_o$ point A are given; see FIG. 8. Arbitrarily move horizontally in the X direction one step S to the right. In accordance with the above, the error E will be $2 I + 1$, which is positive. To reduce the error, point P must now move in the -Y direction, following which movement S', the error will be reduced by $E' = J + (J - 1)$. If the error is still positive, P is still above the arc AB', and further steps in the -Y direction are required. When the error becomes negative point P will be below the arc and steps will be required along the -X direction to bring the error to zero. Continuing in this manner, one sees that the point P staircases around the arc AB and is never more than one step away from the arc at any time.

Figure 9:
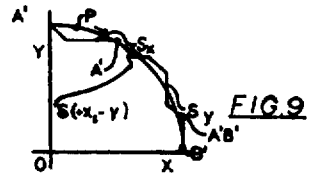
Figure 10:
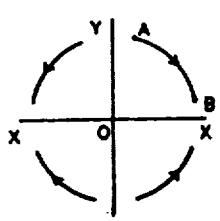
Figure 11:
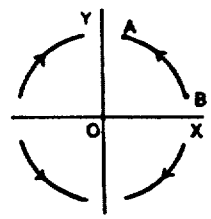

A significant improvement in the above scheme of staircasing can be obtained if point P is allowed to step continuously in, for example, the +X direction and only in the -Y direction as required. Beyond the 45° point when I becomes larger than J, point P will be allowed to step continuously in the -Y direction and only in the +X direction as required. Thus as shown in FIG. 9 during steps $S_x$, point P moves continuously in the +X direction, while no movement occurs in the -Y direction. Steps $S_{(+X, -Y)}$ involving movement in both X and Y directions occur only when required. Similarly point P moves continuously in the -Y direction performing steps $S_Y$ and moves in both X and -Y direction simultaneously only when required. The resulting ramp staircasing more closely approximates the desired slope of arc A'B' in FIG. 9, than is possible by the method of FIG. 8. In addition, this technique greatly simplifies synchronization of a plurality of axes.

In order to implement the staircasing method of FIG. 9 according to the present invention, a computational block is defined as an interval of time between successive steps. As was noted, the steps could be along +X only, -Y only or +X and -Y simultaneously. At the beginning of each block, the logic must decide what step or steps will have to be taken at the end of the computational block to reduce the error accumulated thus far. As previously noted, it will be desirable to step along the +X axis whenever the error is negative (or zero) or I is less than J. It is desirable to step along -Y axis whenever the error is positive (or zero) or I is larger than J. Accordingly define an I-sequence (I-seq)

as a series of operations which will be performed during a computational block as follows:
1. Add the value of I to the present error
2. Increment the value of I by 1
3. Add the new value of I to the new value of the error
4. Move P in the +X direction at the conclusion of the computational block A J-Sequence (J Seq) is defined as a series of operations which will be performed during a computational block as follows:
1. Subtract the value of J from the present error
2. Decrement the value of J by 1
3. Subtract the new value of J from the new value of the error
4. Move P in the −Y direction at the conclusion of the computational block If at the beginning of a computational block, the logic calls for an I seq and a J seq, the first three operations of an I seq will be performed, then the first three operations of the J seq will be performed and lastly a step will be taken along the +X and −Y axes simultaneously.

When programming motion in a circular arc, the magnitude and direction of length of the move along the X and Y axes and the X, Y coordinates of the starting point from the circle center denoted as I and J, are inserted. By examination of the programmed signs of X and I, the logic determines whether the forthcoming problem is of a direct or a cross nature. A direct problem is defined as one where motion is away from the Y axis, toward the X axis. (See FIG. 10) A cross problem is defined as one where motion is away from the X axis toward the Y axis. (see FIG. 11). In order to utilize the same logic for both types of problems, advantage is taken of the symmetry of a circle. It can be seen that motion from B to A is the same as motion from A to B, with the roles I and J interchanged and the roles of X and Y interchanged. Therefore, in a cross problem, the values of I and J are crossloaded into the J and I registers respectively. The logical decisions and operations of an I seq and J seq then will remain the same with the exception that an I seq will culminate with a step along the Y axis whereas a J seq will culminate with a step along the X axis.

To travel in a straight line from A to B, the magnitude of the move along the X and Y axes are inserted into the J and I registers respectively. The identical logical decisions are then made to choose an I seq or J seq as for the circular problem. The difference is that an I seq or J seq merely consists of operations No. 1 and No. 4 mentioned above. Operations No. 2 and No. 3 which account for the square terms in the equations of a circle are not required.

Figure 1:
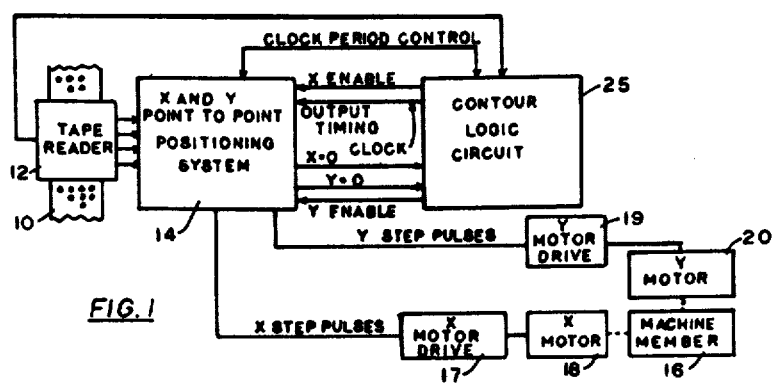
FIG. 1 is a diagram of an overall system showing the position in the system where invention is utilized.

FIG. 1 shows a block diagram of a contour control system in which data pulses derived form a suitable storage such as a punched tape 10 are read by a tape reader 12 and fed to an X and Y point to point positioning system 14 where pulses corresponding to X and Y coordinates of points to which a machine member 16 is to be moved are generated. The X and Y point to point positioning system 14 is identical to the system described in my hereinbefore mentioned U.S. Pat. No. 3,560,830 consisting of the decoder 17, the pulse generator 19, the direction comparator 20, the position control 11 and the counter 18 (FIG. 1 of U.S. Pat. No. 3,560,830). The X and Y pulses are applied via individual respective motor drives 17 and 19 and their respective motors 18 and 20 which position the machine member 16 in an X-Y plane corresponding to the contour data recorded on the tape 10. To the extent described the system is largely conventional. Now according to the invention a contour logic circuit generally designated as reference numeral 25 is provided to which X and Y pulses are applied as well as signals to indicate when the X and Y moves are completed. An output timing clock is also provided by the logic circuit 25 to the point to point system 14. The logic circuit 25 generates control signals which either enable or inhibit the point to point system 14. In addition a signal is sent to a clock (not shown) in the point to point system 14 to control the clock period.

The contour logic circuit 25 and its mode of operation will now be explained in connection with FIG. 2 to which reference is now made. The logic control circuit has an I-J register section generally designated as reference numeral 30 which includes an I register 32 and J register 34. The registers are conventional and need not be shown here in detail. The J register is comprised of a five digit register-counter which is used to store and update if necessary the numerical value of J. During a linear interpolation problem, the value of the move along the X axis is loaded into the J register 34. During a circular interpolation problem the numerical value of J or possibly I is loaded into the J register 34. Referring to FIG. 2, the five presettable decade counters of the J register may be loaded via manual loading gates 38 or tape loading gates 40. Prior to loading, the J register 34 is cleared to "0." Loading of the J register 34 is accomplished by applying logic signals via the "X" pushbutton switches 39. Since it is desirable to have the nines complement of the value of J loaded into the J register 34 and since the output from each of the pushbutton switches 39 is in nines complement form, there is no need for any conversion. When the J register 34 is loaded manually, by means of the pushbutton switch 39 and digits are loaded simultaneously.

Loading of the J register 34 via the tape gates 40 is performed sequentially commencing with the most significant digit and the nines complement of the numerical value. During a circular interpolation problem the value of J must be decremented. This is equivalent to incrementing the nines complement of J which is stored in the J register. The contents of the J register 34 may be gated to either the inputs 50a or 50b of the adder 50 (FIG. 2) by applying a gating signal to J output gates 49 or J output gates 51 respectively.

The I register generally designated as reference numeral 32 is conventional. It is a five digit register-counterlike J register 34. It is used to store and update, if necessary, the numerical value of I. During a linear interpolation problem, the value of the move along the Y axis is loaded into I register 32. During a circular interpolation problem, the numerical value of I or possible J is loaded into the I register 32.

The I register 32 which consists of five presettable decade counters, may be loaded by one or more of a plurality of Y pushbutton switches 53 which via manual loading gates 54 or by tape via tape loading gates 56. Prior to loading, however, the I register 32 is cleared to "0" by applying a momentary pulse if the register is to be manually loaded or via the I/J load control 60 if the I register is to loaded from tape. When manual loading the I register by the pushbutton switches 53 all digits are loaded simultaneously.

Loading of the counters in the I register 32 via tape is performed sequentially commencing with the most significant digit. The contents of the I register 32 are gated to the input 50B of adder 50 by applying a gating signal to I output gates 47.

The I/J load control 60 in the contour logic circuit 25 (FIG. 2) determines what is to be loaded into the I and the J register when entering information via tape. The I/J load control 60 includes a plurality of flip-flops 61, 62, 63, 64, a linear/circular flip-flop 65, direct/cross logic circuit 66, a data load logic gate 67 and a shift register 68; see FIG. 3.

For a linear interpolation problem it is desired to load the numerical value of X into the J register 34 and the numerical value of Y into the I register 32. Following turn-on, and at the conclusion of any loading sequence, flip-flops 61, 62, 63 and 64 are reset via a "clear" pulse or pulse on line 40e. The linear circular flip-flop 65 is set to LIN following turn-on and the conclusion of any problem by virtue of X and X being zero at gates 65a and 65b. Decoding an X($\overline{X}m$) off tape initiates the loading of the numerical value of X into the J register as follows: $\overline{X}m$ sets the output 61b of the flip-flop 61 to logic "1" which in conjunction with a LIN signal at a gate 70 keeps an input 71a to a gate 71 at logic "1". This gate will remain at "1" until the flip-flop 61 is reset by a pulse on line 60a indicating the conclusion of the load. Simultaneously therewith, $\overline{X}m$ sets a logic "1" at the J input to the first stage 68-1 of the shift register 68. Subsequent pulses on the SHIFT line 68a will cause this logic "1" to propagate through the shift register 68 and successively enable lines 40a through 40e which go to the J register 34. Note that prior to loading, the J register 34 is cleared by a logic "1" on line 35a because of a "1" in the first shift register stage 68 and a "1" at gate 68b. (input 71a) When line 40a becomes "1, " the input gates for the first digit of the I and J registers are enabled and they are ready to accept the data on lines 36$_1$, 36$_2$, 36$_4$ and 36$_8$ going to J register 34 and 56$_1$, 56$_2$, 56$_4$ and 56$_8$ going to I register 32 coincident with the next pulse on a line 69. The data on lines 36$_1$, 36$_2$, 36$_4$ and 36$_8$ will actually be the BCD nines complement of the numerical value of X. The lines 56$_1$, 56$_2$, 56$_4$ and 56$_8$ will remain at logic "0" since input 72a at a gate 72 is at logic "0" and thus no data will be entered into I register 32. Successive digits are loaded in a similar manner until line 40e resets the flip-flop 61 at the conclusion of the load. When a Y is decoded off tape, the numerical value following is loaded into I register 32 in a similar manner.

For circular interpolation problems, values for I and J will be programmed in addition to X and Y. Decoding an I or J ($\overline{I}m$ or $\overline{J}m$) will initiate a loading sequence at gate 67 and in addition set the LIN/CIR flip-flop 65 to CIR. Prior to loading the value of I and J, it is required to know whether the circular interpolation problem is of a direct or cross nature. A direct problem is defined as one where motion is away from the Y-axis toward the X-axis. When this is so the value of I and J are loaded into the I and J registers 32 and 34 respectively. This is accomplished by a simultaneous logic "1" at the inputs to gate 73 when loading I and at the inputs to gate 74 when loading J. A cross problem is defined as one where motion is away from the X-axis toward the Y-axis. When this is so, the numerical value of I is loaded into the J register 34 with a logic "1" at the inputs of a gate 75. When loading J, the numerical value of J is loaded into the I register 32 with a logic "1" at the inputs to a gate 76.

When motion is from the Y-axis toward the X-axis, the algebraic signs of X and I agree. When motion is from the X-axis toward the Y-axis, the signs of X and I disagree. These relationships are utilized to set the conditions for the direct and cross logic circuits respectively. Following the decoding of X($\overline{X}m$) the flip-flop 61 is set such that logic "1" is at 61b. The sign immediately following is set into a flip-flop 77 where the output 77a represents X+ and the output 77b represents X−. A similar arrangement is used to develope I+ or I− in the flip-flop 78. The outputs of the two flip-flops 77 and 78 are then compared. For an X+ and an I+ 77a will be at logic "1" and 78a will be at logic "1" respectively. For an X− and I− 77b will be at logic "1" and 78b will be at logic "1" respectively. For an X+ and I+ or X− and I− the signal "dir" will be at logic "1" and conversely signal "crs" will be at logic "0". For an X+ and I−; X− and I+ "crs" will be at logic "1" and "dir" will be at logic "0." The state of the "dir" and "crs" signals will now remain static for the balance of the loading process. For linear problems "dir" signal will be at logic "1. "

The error register 70 in FIG. 2 stores the value of the error accrued during the interpolation process. The status of the error register, zero, positive or negative, is one of the necessary inputs to the control logic. The error register is conventional. It consists of 24 flip-flops and associated clock and clear gating, sign decoding (200 and output gating (202). The error register must be cleared prior to the start of each new problem. This is accomplished by applying a logic "0" to the error register. This logic level of "0" occurs following turn-on and following the completion of each problem. The outputs of adder 50 are wired directly to all 24 error register inputs. Information present at the error register inputs are loaded into error register 70 by applying a momentary clock E signal. The contents of the error register 70 can be gated to input 50A of adder 50 by applying an E gate signal. Numbers stored in error register 70 are in BCD tens complement form. Positive values of error have a numerical value of zero through four in the most significant digit of the first four flip-flops in error register 70 whereas negative values of error have a numerical value of five through nine. Accordingly, the state of the first digit is decoded to ascertain the error sign. An error of zero is ascertained by examining the state of each digit. Positive values of error include a zero error.

Figure 4:
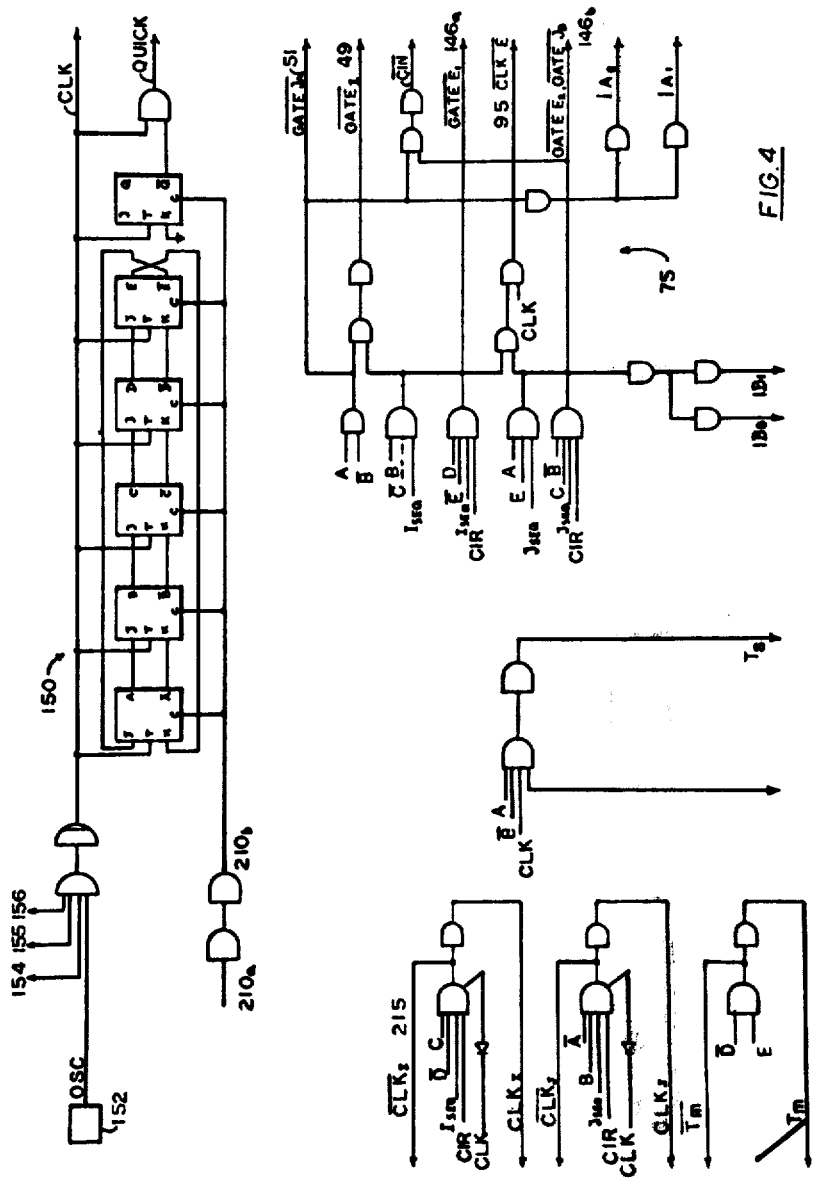
FIG. 4 is a diagram of a timing logic circuit.

The timing logic circuit 75 shown in FIGS. 2 and 4 generates all the necessary timing signals and clock pulses, which in conjunction with signals from the control logic 80, controls the basic operations during a linear or circular interpolation problem.

A timing cycle or computational block is broken into ten equally divided timing segments through the use of a five stage conventional twisted ring counter, generally designated as reference numeral 150 and comprised of J-K flip-flops, serially coupled together with the last stage output cross coupled to the input of the first stage. Following turn-on and at the completion of each problem, the counter is reset to zero via a pair of NAND gates 210A and 210b. An input oscillator 152 is gated with inputs 154, 155 and 156 which will cause the ring counter 150 to advance through all of its states. In each state, decoding only two flip-flop states, uniquely defines that state.

The first clock pulse sets the ring counter from 00000 to 10000 state. During this state, the conditions under which the balance of the computational cycle will operate (I sequence, J sequence, or both) is set. Among the information required for this decision is the relative magnitude of I and J. To effect the information, the contents of the J and I registers 34 and 32 respectively are gated to adder inputs 50A and 50B of adder 50. In addition, a BCD nine will be placed into the most significant adder digit and an input carry ($\overline{\text{Cin}}$) is generated. Since the nines complement of the numerical value of J is stored in the J register 34 the output of the adder 50 is I-J in tens complement form. Decoding the most significant digit of the adder indicates whether I is less than or greater than J. This ring state in conjunction with the next clock pulse, is used to generate the pulse Ts which is used to clock set the flip-flops in the control logic 80.

The next ring state (11000) is used to gate the contents of the I register 32 to the input 50B of the adder 50 and also used to gate the contents of the error register 70 to input 50A of adder 50, if the control logic 80 has called for an I sequence for this computational cycle. This ring state, in conjunction with the next clock pulse, generates output 95 which is used to set the outputs of the adder 50 into the error register 70.

The following ring state (11100) in conjunction with the next clock pulse will generate a $CLK_I$ 215 which is used to increment the contents of the I register 32 if the control logic has called for an I sequence and circular interpolation is being performed.

The next ring state (11110) duplicates what was performed in state 11000 for circular interpolation only. The following three ring states are analagous to the preceding three with the roles of I and J interchanged. Nothing is performed in the ninth ring state 00011. The tenth ring state, 00001, generates the pulse $T_M$ which is the input pulse to the basic X-Y point to point positional system. The ring counter will be at the initial state 00000, following the transition of the next clock pulse and is ready to begin the cycle anew. This will continue until the counters in the main counting channel (X and Y) have both been counted to zero signifying that the problem has been completed. A decade zero signal is then generated which resets the ring to its initial state.

The registers in the point to point positional system are actually preloaded with the nines complement of the magnitude of X and Y, and are then counted up toward zero. What is really desired, however, is the tens complement. This can easily be accomplished by adding one to the nines complement or by issuing one pulse to both counters prior to the start of the problem. This is performed with a $\overline{\text{QUICK}}$ pulse which is issued just once following the start of the ring counter cycling.

Figure 5:
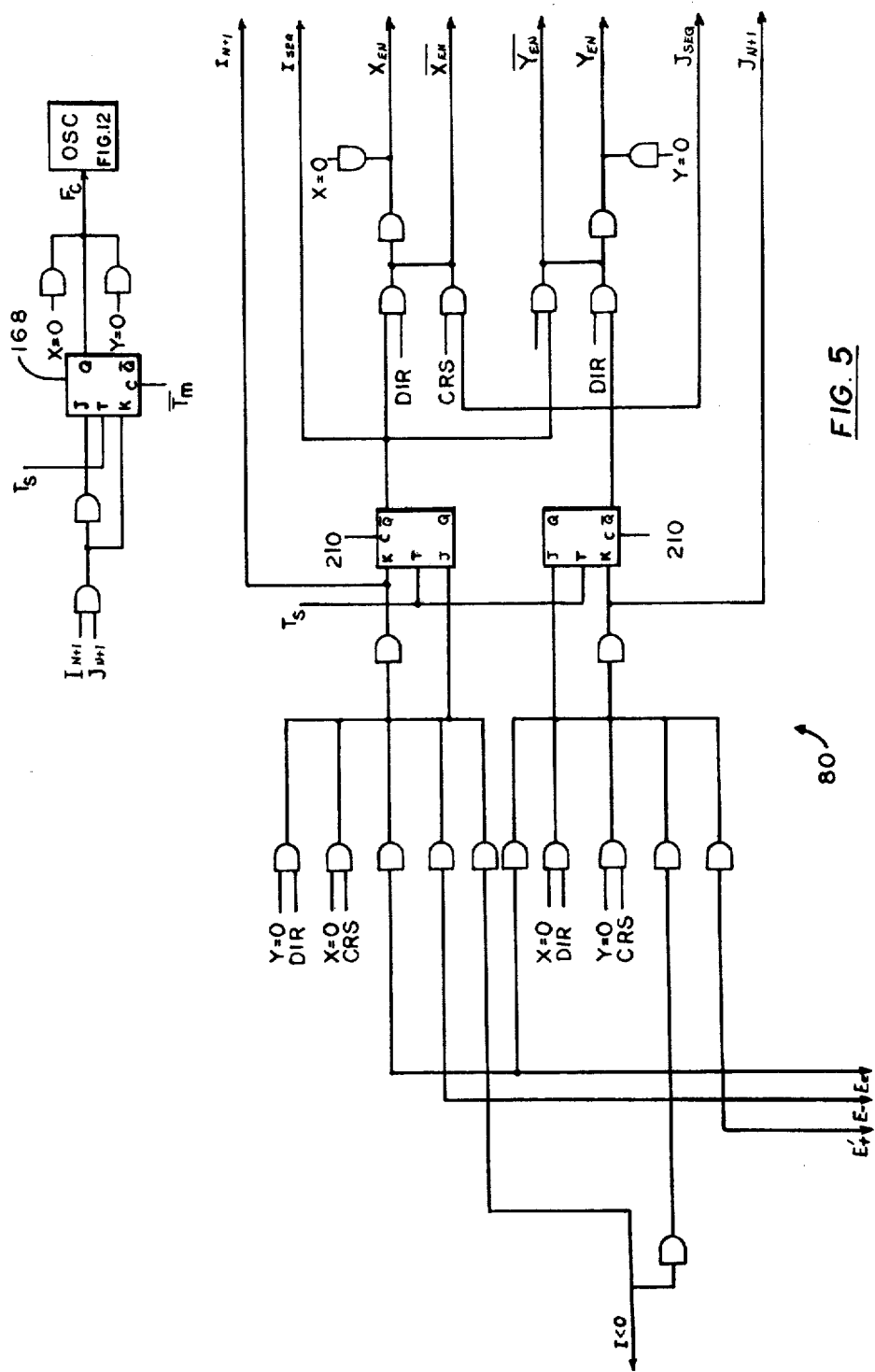
FIG. 5 is a diagram of a control logic circuit.

The purpose of the control logic 80 shown in FIGS. 2 and 5 is to determine whether any given computational cycle will contain an I sequence, a J sequence or both and to enable the appropriate counting channel in the main logic. In addition the control logic controls the period of the input oscillator so that the resultant motion, be it along the X axis, the Y axis, or both simultaneously, is of constant velocity throughout the problem.

In accordance with the mechanization of the error equations an I sequence is desired under the following conditions: (a) the numerical value of I is less than J, (b) the error is negative, or (c) the error is zero. A J sequence is desired if (a) the numerical value of I is larger than or equal to J, (b) the error is positive or, (c) the error is zero. These conditions are sampled at the beginning of each computation cycle and are set into the I seq and J seq flip-flops at the conclusion of the $T_S$ pulse. If the particular problem being performed is of a direct nature, the presence of an I seq and J seq will enable the X and Y counting channels and result in a move being taken along the X and Y axes, respectively. If the problem is of a cross nature, then an I seq and J seq enable the X and Y channels respectively.

Inconsistant values of X, Y, I and J will of course result in incorrect motion in the plane. However, the control logic will alwlays ensure that the programmed end points are realized regardless of the path taken in achieving this goal. This is accomplished by forcing an I seq and inhibiting a J seq if the Y counter has been reduced to zero (for a direct problem). Similar statements apply for conditions where X = 0 or the problem is of a direct or cross nature.

The adder 50 is used to sum either the contents of the I and J register 32, 34 the error register 70 and the I register 32, or the error register 70 and the J register 34. Since values stored in the J register 34 are in nines complement form, the sums presented at the adder outputs are in effect I minus J, error plus I or error minus J.

The adder 50 shown in FIG. 2 is of a known type. It consists of six four-bit adders and six sum correction networks. The latter are required to form the correct sum and carry which are not in themselves formed when adding two BCD numbers. In addition the first four bits of the adder output are decoded by sign decoder 201 to ascertain the sign of the adder output. In this manner the relative magnitude of I and J is determined when performing the operation I minus J.

The oscillator period control flip-flop 168 is set at the beginning of each computational block to assure constant velocity. If the control logic is calling for an I seq and a J seq, resulting in simultaneous motion along the X and Y axes, the resultant step period is increased by approximately 40 percent over the period for stepping in just the X axis or Y axis. This flip-flop is reset by the pulse $\overline{T}_M$ toward the end of the cycle. Adjusting the oscillator pulse period on a pulse to pulse basis, depending on how many axes will move at the end of that period, provides a good approximation of constant velocity of the point in the X-Y plane and is accomplished in a manner now to be described.

Referring now to FIG. 12, there is shown a variable clock circuit for adjusting the oscillator pulse period which depends upon the number of axes the machine is to operate. An input DC voltage from a manually set potentiometer is applied to an operational amplifier inverter 220. This voltage is proportional to a desired clock rate. The output from this inverter is applied through a resistor 222 to drive an integrator 224 which may consist of a conventional operational amplifier with capacitance feedback. The output from the integrator 224 is applied to a comparator 226 whose output in turn is applied to a gate 227 and one input to a gate 230. The output from the comparator is inverted by the gate 227 and applied as one input to the gate 229. The gates 229 and 230 are crosscoupled in a conventional fashion to form a flip-flop. Thus the output from the gate 229 is applied as an input 226a to the integrator 226 as well as to the input of the gate 230, and the output from the gate 230 is the source of clock pulses in the system as well as being applied to the input of the gate 229. Assuming input 226a of the comparator 226 is at a positive voltage ("High") the integrated output at terminal 226b from the integrator 224 ramps or rises until it reaches a voltage equivalent to the input at 226a at which time the output from the comparator 226 switches from a logic "high" to a "low" thereby driving the voltage at terminal 226a "low." The changing of the output of the comparator 226 provides a "low" input to a gate 232 which now has a positive ("High") output to turn on a solid state switch 234. The DC voltage at the output of the inverter 220 is also applied to the input of an inverter 236. The switch 234 applies the output voltage of the inverter 236 to a resistor 238 which is connected to a summing junction 239 of the integrator 224. The current from the output of the inverter 236 is of a polarity opposite that applied through the resistor 222 from the inverter 220. It should also be noted that the resistance of the resistor 238 is half the resistance of the resistor 222. Thus the input current to the integrator 224 from the junction 239 is reversed and the output from the integrator 224 goes linearly in the negative direction until it reaches zero volts and again switches the output of the comparator 226 to open the switch 234 whereby the integrator integrates again in the positive direction. In this way, a triangular wave is generated at the integrator output 226b and a square wave at the output of the gate 230 which is used as the system clock whose frequency is proportional to the input DC voltage.

A signal Fc may be applied at logic "low" to cause a gate 240 to turn on a solid state switch 242, and place a resistor 244 in parallel with the resistor 238, and thereby reduce the time for the integrator 224 to ramp from the selected voltage to zero. In this manner the clock period is decreased from that when the switch 242 is open to approximate a constant velocity for two axes control. Resistor 244 is chosen in a two axis control system to provide a period equal to $1/\sqrt{2}$ period when Fc is a logic "high." This results in a close approximation to a constant point velocity for a two axis contour with Fc "low" for an impending single axis step and "high" for an impending two axis move. It should be noted that the inverters 220 and 236 are preferably operational amplifiers and the gates 227, 229, 230, 232 and 240 are conventional "Nand" gates.

Although not shown, another switch and resistor could be added in parallel with switch 242 and resistor 244 and turned "on" via another gate for an impending one or two axis step in a three axis contouring system. In this event, the new resistor and the resistors 238 and 244 would be sealed to provide switchable clock periods in the ratio $1:\sqrt{2}:\sqrt{3}$ and the logic would select the appropriate period depending on whether the impending step next to be taken in one, two, or three axes. The circuit of FIG. 12 thus provides a close approximation to constant space velocity by having the logic choose between one of the three possible periods depending on whether the next step is to be made by one, two or all three axes.

Although the invention has been described in FIGS. 1 through 12 in a control system for driving a machine member in two mutually perpendicular directions the invention can be used with obvious modifications to drive a machine member in any one of three mutually perpendicular directions.

The technique described above results, for a linear move, in the axis with the longer move running continuously and the other moving only as required to stay within one step of the desired line. A three axis linear move can be accomplished by two identical two axis channels, one channel generating the contour steps required for the axis with the longest move and one of the other two, and the second channel generating the contour steps required for the axis with the longest move and the second of the other two. The result will be that the axis with the longest move will run continuously, with each of the other two moving as required to stay within one step of the line in three dimensional space.

Constant net velocity can be approximated as for a two-axis problem, with the pulse period being increased by forty percent if two axes are to move, and by seventy percent if three axes are to move. Similarly, more than three simultaneous motions may be linearly interpolated by adding additional two axis channels.

It should be understood that the foregoing relates to only a preferred embodiment of the invention and that it is intended to cover all changes and modifications of the example of the invention herein chosen for the purposes of the disclosure, which do not constitute departures from the spirit and scope of the invention as defined by the appended claims.

The invention claimed is:

1. A control system for positioning a machine member in accordance with a set of predetermined input instructions corresponding to a prescribed path of movement of said machine member comprising:

motor driving means operatively connected to said machine member to drive the same in at least two mutually perpendicular directions;

pulse generating means for generating separate trains of pulses corresponding to magnitudes of coordinates in said directions of points along a prescribed path, said pulse generating means being operatively connected to said motor driving means for actuating the same by the respective trains of pulses; and a contour logic circuit means connected to said pulse generating means and arranged to detect deviation from said prescribed path, said contour logic circuit being connected to said motor driving means for enabling the same to respond to pulses applied thereto by said pulse generating means whereby a portion of said motor driving means drives said machine member continuously in one of said directions and permits another portion of said motor drive means to drive said machine member in another direction only when said machine member arrives at or overshoots said path, said contour logic circuit means comprising:

a first and second coordinate register respectively arranged to receive data corresponding to magnitudes of coordinates in said two directions respectively;

an error register means for generating data corresponding to deviations between magnitudes of coordinates prescribed by the instructions and magnitudes of coordinates of present location in which said first and second motor driving means actually move said machine member; and a logic circuit means connected in circuit with said coordinate registers and said error register means to enable either motor driving means selectively to drive said machine member in either direction depending on the particular deviations determined by said error register means.

2. A control system as defined by claim 1 wherein said motor driving means comprises a first and second motor connected to said machine member for driving in two mutually perpendicular directions.

3. A control system as defined by claim 2, further comprising:

a first and second set of input switches respectively arranged for inserting data corresponding to magnitudes of coordinates of said path in said two directions; and a first and a second manual load gate respectively connected between said first and second input switches and said first and second coordinate registers for inserting data corresponding to magnitudes of coordinates in said two directions into said first and second registers.

4. A control system as defined in claim 3, further comprising tape load gates respectively connected to said first and second coordinate registers for inserting coded tape date corresponding to magnitudes of coordinates in said two directions into said first and second registers.

5. A control system as defined by claim 4, further comprising a load control circuit connected in circut with said first and second coordinate registers respectively for determining the data to be entered into said first and second registers when said data constitutes coded tape data.

6. A control system as defined by claim 2, further comprising an adder circuit means for selectively adding contents of said error register means and either one of said first and second registers for application to said control logic circuit.

7. A control system as defined by claim 1, further comprising a logic for modifying the pulse period on a pulse-to-pulse basis in order to achieve constant velocity of the point in motion.

* * * * *